C. E. CARPENTER.
CONTROLLING DEVICE.
APPLICATION FILED MAY 9, 1907.
985,510.
Patented Feb. 28, 1911.
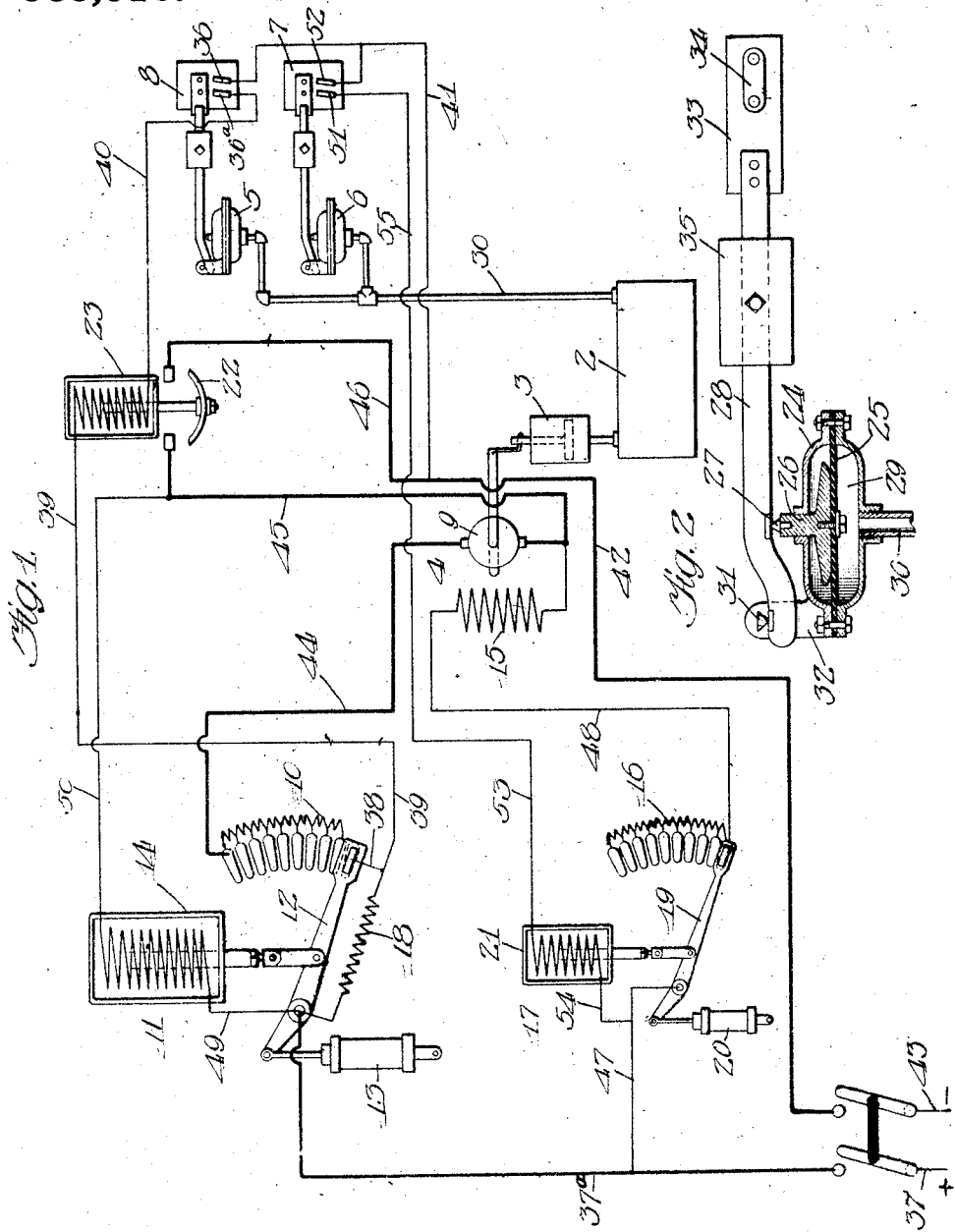
WITNESSES:
Robert N. Weir
W. Perry Hahn
INVENTOR
Charles E. Carpenter
BY
ATTORNEY

UNITED STATES PATENT OFFICE.

CHARLES E. CARPENTER, OF NEW YORK, N. Y., ASSIGNOR TO THE CUTLER-HAMMER MFG. CO., OF MILWAUKEE, WISCONSIN, A CORPORATION OF WISCONSIN.

CONTROLLING DEVICE.

985,510.   Specification of Letters Patent.   Patented Feb. 28, 1911.

Application filed May 9, 1907. Serial No. 372,738.

*To all whom it may concern:*

Be it known that I, CHARLES E. CARPENTER, a citizen of the United States, residing at New York city, in the county of New York and State of New York, have invented new and useful Improvements in Controlling Devices, of which the following is a full, clear, concise and exact description, reference being had to the accompanying drawing, forming a part of this specification.

My invention relates to improvements in means for starting and controlling electric motors and particularly to systems for automatically controlling a motor or motors for operating pumps, compressors or the like.

In the preferred embodiment of my invention I provide means for automatically removing the resistance in the armature circuit of the motor to cause the motor to operate at one speed, other means for automatically inserting a resistance in the field circuit of the motor to cause the motor to operate at a second speed, and means operating under certain predetermined conditions to cause said first mentioned means to operate and operating under other conditions to cause said second mentioned means to operate.

Broadly considered, however, my invention contemplates resistance controlling means for causing the motor to operate in different ranges of speed, and means operating under varying conditions for causing said resistance controlling means to operate.

Heretofore in using electric motors for operating pumps or compressors it has been necessary to use two or more pumps and motors, or to use one pump and one motor large enough to deliver a supply sufficient for the maximum demand, and when using one large motor on the above conditions, an unusually large tank must also be provided, as otherwise the motor would be constantly stopping and starting with a normal demand on the tank. By the provision of my system, I am enabled to supply a greatly varying demand upon the tank, and am also enabled to use a much smaller tank than has heretofore been used. This is particularly an advantageous feature in considering the first cost of installing an apparatus, and also in considering the space occupied by a tank.

For the purpose of disclosing my invention I have illustrated in the accompanying drawings one embodiment thereof.

In Figure 1, I have shown a diagrammatic view of my invention illustrating the circuit arrangement thereof, and in Fig. 2 I have illustrated in detail one of the pressure gage switches.

In the embodiment of my invention illustrated, pressure is maintained in a tank 2 by a pump or compressor 3 operated by a motor 4. The operation of the motor is controlled from pressure gages 5 and 6 operating switches 7 and 8.

The armature 9 of the motor is provided with a resistance 10 controlled by a starting device 11, provided with a contact arm 12, controlled by a dash-pot 13 and operated by a solenoid 14. The field 15 of the motor is provided with a resistance 16, controlled by the field resistance regulator 17. The resistance regulator is provided with a contact arm 19 controlled by a dash-pot 20 and operated by a solenoid 21. The motor circuit is controlled by a switch 22 operated by a solenoid 23.

The form of pressure gage and switch illustrated in Fig. 2 comprises a casing 24 having arranged therein a diaphragm 25. One side of the diaphragm is provided with a rod 26 which projects through the casing and is provided with a knife edge, upon which rests an arm 28 at a point intermediate of its ends. The opposite side of the diaphragm 25 forms, in connection with the casing 24, a chamber 29 with which the tank 2 is connected by a suitable pipe 30. The arm 28 at its rear end engages under a knife pivot 31 secured in a bracket 32, suitably supported, and at its opposite end has mounted thereon a fiber extension 33, which carries a bridging contact 34. A weight 35 is adjustably mounted on arm 28 to adjust the pressure at which the switch shall operate. It is obvious that a variation in pressure in the tank 2 will cause the diaphragm to raise or lower the arm 28.

In operation we will assume that it is desired that the pressure in the tank 2 should not fall below 140 pounds and that it is desired to maintain the pressure as near as possible to between 150 and 160 pounds. The gage 5 will be adjusted to operate to close the switch 8 when the pressure is 150 pounds, and the gage 6 will be adjusted to close switch 7 when the pressure falls to 140 pounds. Assuming now that the pressure in the tank 2 falls until it is 150 pounds, the pressure against the diaphragm 25 of the gage 5 will therefore be so reduced that the weight on the arm thereof will cause the outer end of the arm to drop and the bridge contact on the end thereof will bridge the contacts 36ª and 36. A circuit will therefore be established from one side 37 of the line by conductor 37ª, through the arm 12, by conductors 38 and 39, through the winding of the solenoid 23, conductor 40, switch 8, conductors 41 and 42, to the opposite side 43 of the line. This energizes the solenoid 23 and closes the switch 22, completing the motor circuit from the positive side 37 of the line by conductor 37ª, arm 12, conductor 44, through the armature 9 of the motor, conductor 45, switch 22 and by conductor 46 and 42 to the opposite side 43 of the line. Current also flows through the field winding of the motor from conductor 37ª, by way of conductor 47, arm 19, conductor 48, field, to conductor 45. At the same time the motor circuit is closed, circuit will also be closed from conductor 37ª, by conductor 49, through the winding of the solenoid 14, by conductor 50 and switch 22, to conductor 46, energizing the solenoid 14 which raises the arm 12 gradually cutting the resistance 10 out of the armature circuit and raising the motor to its first speed. As soon as the arm 12 moves off of the first of the resistance contacts, a resistance 18 is inserted in circuit with the winding of the solenoid 23, which so reduces the strength thereof, that while it will maintain the switch 22 closed, it will not be sufficiently strong to close the switch in event it opens. The motor will continue to run until the pressure in the tank 2 is raised sufficiently, when the pressure in the chamber 29 will be correspondingly raised, and the switch 8 will be opened, stopping the motor. Now we will assume that while the motor is still operating, with all resistance cut out of the armature circuit, the pressure in the tank falls below, say 140 pounds, then the pressure in the gage 6 will fall to such an extent that the arm of the switch 7 will drop and the switch 7 will bridge the contacts 51 and 52. This will close a circuit through the winding of the solenoid 21, from one side 37 of the line, by conductors 37, 47 and 54, through the winding of the solenoid 21, conductor 53, switch 7, conductors 41 and 42, to the opposite side 43 of the line. The solenoid thus energized operates the arm 19 to insert the resistance 16 in the field circuit and the motor 9 will operate at its second speed under a weakened field. As the pressure increases to, say 155 pounds the switch 7 will be opened, thus deenergizing the solenoid 21, allowing the arm 19 to drop, cutting out the field resistance 16, thereby strengthening the field of the motor and thus slowing down the speed of the motor to the first or slow speed. If the pressure continues to rise to say 160 pounds the switch 8 will open and stop the motor.

It will be understood that floats or any other devices for operating the switch 7 and 8 may be used in connection with my invention without departing from the spirit thereof. It will also be understood that one gage instead of two may be used.

It will further be understood that various other modifications may be made in the construction and arrangements of the parts of my invention without departing from the spirit thereof, as set forth in the appended claims.

Having thus described my invention what I claim as new and desire to secure by Letters Patent, is:

1. In a system of control for electric motors, the combination with a plurality of automatically operated devices for starting the motor and causing the same to operate at different speeds and means automatically operating under predetermined conditions for causing the operation of one of said devices and under other predetermined conditions for causing the operation of another of said devices to vary the speed of the motor.

2. In a system of control for electric motors, the combination with a plurality of electroresponsive devices for starting the motor and causing the same to operate at different speeds and means automatically operated under predetermined conditions for causing the operation of one of said devices and under other predetermined conditions for causing the operation of the other of said devices to vary the speed of the motor.

3. The combination with a motor, of an electro-magnetic device for regulating the armature speed thereof, a second electromagnetic device for regulating the field thereof, a switch operating automatically under predetermined conditions for controlling said armature regulating device and a second switch operating under predetermined conditions for controlling said field regulating device.

4. A combination with a motor, of resistance in armature circuit thereof, an electromagnetic device for controlling said resistance, a resistance in the field circuit thereof, an electro-magnetic device for controlling said field resistance, a switch automatically operating under predetermined conditions for controlling the operation of said armature resistance controlling device, and a second switch also automatically operating under predetermined conditions for controlling the operation of the field resistance controlling device.

5. The combination with the motor, of means for controlling the armature thereof, a second means for controlling the field thereof, a switch controlling said armature controlling means, a pressure gage arranged to operate said switch when the pressure falls below a predetermined point, a switch for controlling said field regulating device and a pressure gage arranged to operate said switch when the pressure falls below a second predetermined point.

6. The combination with a motor, of an armature resistance therefor, an electromagnetic means for automatically removing said armature resistance from circuit, a field resistance, an electro-magnetic means for automatically inserting said field resistance in circuit, a switch operating automatically under predetermined conditions for controlling said first mentioned electro-magnetic means and a second switch also operating automatically under predetermined conditions for controlling the operation of said second electro-magnetic means.

7. The combination with a motor, of a resistance in the armature circuit thereof, an electro-magnetic device for automatically removing said resistance from circuit, a resistance in the field circuit thereof, an electro-magnetic means for automatically inserting the field resistance in circuit, a switch for controlling said first mentioned means, a fluid pressure device for automatically operating said switch under predetermined conditions, a second switch for controlling the operation of said second mentioned magnetic means and a fluid pressure device automatically operating under predetermined conditions for operating said second switch.

8. In a motor controlling system, the combination with automatic means for starting the motor and causing the same to operate in a plurality of speed ranges, of a plurality of devices operating under different predetermined conditions for controlling said means to vary the speed of the motor.

9. In a system for controlling electric motors, the combination with means for causing the motor to operate in a plurality of speed ranges, of a device operating under predetermined conditions for operating said controlling means to cause the motor to operate at one speed, and a device operating under other predetermined conditions for subsequently operating said controlling means for causing the motor to operate at an increased speed.

10. In a system for controlling electric motors, the combination with means for causing the motor to operate in a plurality of speed ranges, of a fluid pressure device for operating said controlling means to cause the motor to operate at one speed, and a second fluid pressure device for subsequently operating said controlling means to cause the motor to operate at an increased speed.

11. In a system of control for electric motors, the combination with an electromagnetically operated main switch, an armature resistance, an electromagnetically operated controlling member therefor, said main switch being adapted, when closed, to cause the operation of said member, a field resistance, an electromagnetically operated controlling member therefor, a pressure actuated switch adapted to cause said main switch to close under predetermined conditions, and another pressure actuated switch adapted to cause the operation of said field resistance controlling member under other predetermined conditions.

12. In a system of control for electric motors, the combination with an electromagnetically operated main switch, an armature resistance, an electromagnetically operated controlling member therefor, said main switch being adapted to control the operation of said controlling member, a field resistance, an electromagnetically operated controlling member therefor, a pressure actuated switch adapted to cause said main switch to close under predetermined conditions, another pressure actuated switch adapted to cause the operation of said field resistance controlling member under other predetermined conditions, and means for adjusting said switches to operate in a definite sequence to insure the removal of the armature resistance from circuit prior to the insertion of the field resistance in circuit.

13. In a system for controlling electric motors, the combination with a motor of a plurality of means for causing the motor to operate at a plurality of speeds, and a fluid pressure mechanism operating under different predetermined conditions for operating said motor controlling means in a definite sequence to cause the motor to operate at any one of a number of different predetermined speeds.

14. In a motor controlling system, the combination with an electro-responsive device for causing the motor to operate at one speed, a second electro-responsive device for causing the motor to operate at another speed, and a fluid pressure mechanism operating under predetermined conditions for automatically controlling the circuit through said electro-responsive devices.

15. In a motor controlling system, in combination, automatic means for causing the motor to operate at one speed, additional automatic means for causing the motor to operate at an increased speed, and means operating under different predetermined conditions to cause the successive operation of said automatic means to vary the speed of the motor.

In witness whereof, I have hereunto subscribed my name in the presence of two witnesses.

CHARLES E. CARPENTER.

Witnesses:
A. J. HORTON,
ROBERT LEWIS AMES.